US008634169B2

(12) United States Patent
Li

(10) Patent No.: US 8,634,169 B2
(45) Date of Patent: Jan. 21, 2014

(54) ANTI-LIGHTNING AUTOMATIC SWITCH FOR A SATELLITE TELEVISION RECEIVER

(75) Inventor: Jun Li, Hangzhou (CN)

(73) Assignee: Hangzhou Cheele Electronics Co., Ltd., Huangzhou (CN)

( * ) Notice: Subject to any disclaimer, the term of this patent is extended or adjusted under 35 U.S.C. 154(b) by 465 days.

(21) Appl. No.: 13/092,354

(22) Filed: Apr. 22, 2011

(65) Prior Publication Data

US 2011/0261494 A1 Oct. 27, 2011

(30) Foreign Application Priority Data

Apr. 22, 2010 (CN) .......................... 2010 1 0152576

(51) Int. Cl.
*H02H 1/00* (2006.01)

(52) U.S. Cl.
USPC ............................................................. 361/1

(58) Field of Classification Search
USPC ............................................................. 361/1
See application file for complete search history.

(56) References Cited

U.S. PATENT DOCUMENTS 4,594,532 A * 6/1986 Edlin et al. .................... 315/331
5,083,042 A * 1/1992 Merchant ...................... 307/149
5,865,390 A * 2/1999 Iveges .......................... 242/375

FOREIGN PATENT DOCUMENTS

CN 2332113 8/1999
CN 201015166 1/2008

* cited by examiner

*Primary Examiner* — Stephen W Jackson
(74) *Attorney, Agent, or Firm* — Hamre, Schumann, Mueller & Larson, P.C.

(57) ABSTRACT

An anti-lightning automatic switch for a satellite television receiver comprises a housing, external terminals which are connected with external cables are respectively arranged at two ends of the housing, wherein an on-off interface is arranged at the other end of the external terminal on one side, and internal cable is connected to the other end of the external terminal on the other side; and a guide rail unit is arranged in the housing, a driving mechanism is mounted on the guide rail unit, the driving mechanism is connected with the external terminal on the other side through the internal cable, a control circuit board and a motor controlled by the control circuit board are arranged on the driving mechanism, and a contact which is used in combination with the on-off interface is mounted at one end of the driving mechanism.

12 Claims, 4 Drawing Sheets

ANTI-LIGHTNING AUTOMATIC SWITCH FOR A SATELLITE TELEVISION RECEIVER

TECHNICAL FIELD

The invention relates to an anti-lightning device, in particular to an anti-lightning automatic switch which can be turned on and turned off automatically and be used on a satellite television receiver.

BACKGROUND

A direct-to-home (DTH) satellite television receiving system needs an outdoor satellite receiving antenna and a high-frequency head to receive satellite signals, and the signals are further sent to an indoor satellite television receiver through a cable. In order to achieve good receiving effect, an outdoor satellite receiving antenna is often installed in high places, such as a roof, the top part of a pillar or the open place without obstruction. Then, the satellite receiving antenna becomes an object which is vulnerable to lightning strikes. Once the satellite receiving antenna is struck by lightning, lightning strike overvoltage and lightning current will enter into indoor space through the cable, thereby not only being possible to damage the receiver and other electrical appliances connected therewith, but also being possible to cause fire and personal injuries. The lightning protection becomes an increasingly important problem along with the growing popularization of the DTH satellite television receiving system. For example, the Chinese Patent Publication No. CN2332113Y, entitled "Power supply automatic control device of satellite television ground receiving station" discusses a housing, a circuit board, three working state indicating light-emitting tubes arranged on a panel of the housing, and an input power supply wiring terminal, a power supply output wiring terminal and a manual or automatic selector switch arranged on a backboard of the housing.

The grounding method is traditionally used for lightning prevention, and the antenna body and the cable are grounded before entering into the indoor space, thereby being capable of leading the current into ground when suffering from direct lightning or induced lightning, limiting overvoltage and weakening or eliminating the loss caused by the lightning strikes. As the actual grounding conditions are different in thousands ways, the grounding impedance cannot reach the ideal value; furthermore, due to the presence of multi-point grounding situation, it is still possible to raise the ground potential to the critical value or cause the dangerous potential difference among different grounding points when being struck by lightning. In most cases, the lightning damages cannot be eliminated by only using the grounding measure. The use of a surge protection device (SPD) is another traditional anti-lightning method. In the satellite receiving system, the SPD is often connected between a cable core and a shielding layer in parallel, when the overvoltage appears between the cable core and the grounding external shielding layer, the SPD is conducted for bypassing the surge current into the ground and further limiting the overvoltage between the core and a ground wire. The SPD must be used together with the grounding measure. The SPD can only limit the overvoltage between the core and the ground wire, but not limit the ground potential rise. For example, a detection unit of the Chinese Patent Publication No. CN201015166Y, entitled "Signal anti-lightning type automatic reclosing switch" is connected downstream of the input end of a power circuit in series. A circuit state detection unit is connected upstream of the output end of the circuit. The real-time state of the circuit at the input end and the real-time state of the circuit at the output end are delivered to a processor unit. The switch is further provided with a signal anti-lightning module, and an overcurrent protection device is connected on a signal wire in series and positioned between the input end and the output end.

The above traditional anti-lightning method has certain effects for preventing or reducing the loss caused by the lightning strikes, but cannot completely eliminate the lightning damages. Actually, another effective method is to cut off an intrusion path of the lightning overvoltage and the lightning current, and further take the high-voltage insulation measure between a protected device and an object which may be struck by lightning. For the satellite television receiving system, a cable plug which is connected from the outdoor satellite receiving antenna to the satellite television receiver needs to be pulled out after watching television each time, and then even the antenna is struck by lightning, the receiver and other devices connected therewith cannot be damaged. However, few people do in such a way in practice, this is because it is very inconvenient to pull out the plug after watching television each time and re-plug in the plug before watching television again. Only pulling out the plug before the lightning weather can be more effort-saving, but people need to always pay attention to weather forecasts, thereby being still inconvenient. Furthermore, the plug cannot be pulled out in the event of the lightning weather to avoid the possibility of leading people to be struck by lightning.

SUMMARY

The disclosure relates to an anti-lightning automatic switch which is connected to a cable between a satellite receiving antenna and a satellite television receiver in series, and can protect the receiver and devices connected therewith from being damaged by lightning strike overvoltage and lightning current when the satellite antenna is struck by lightning, avoid manual plugging-in and pulling-out and realize long service life, so as to solve the technical problems of poor anti-lightning effect, need of plugging in and pulling out a plug each time and situation of being easy to cause personal injuries in the prior art.

The anti-lightning automatic switch for the satellite television receiver is compact, and has a low cost and low power consumption, and can design the break distance longer according to needs, lead a contact to be in a radio frequency coaxial structure, be applicable to on-off radio frequency signals and a direct current power supply, realize full automatic working and eliminate the need of manual intervention, thereby solving the technical problems of large volume, high cost, non-coaxial structure of the contact and being not applicable to lightning prevention of the satellite television receiver in an electrical switch in the prior art.

The above technical problems are solved through the following technical scheme: an anti-lightning automatic switch for a satellite television receiver, comprising a housing, external terminals which are connected with external cables are respectively arranged at two ends of the housing, wherein an on-off interface is arranged at the other end of the external terminal on one side, and internal cable is connected to the other end of the external terminal on the other side; and a guide rail unit is arranged in the housing, a driving mechanism is mounted on the guide rail unit, the driving mechanism is connected with the external terminal on the other side through the internal cable, a control circuit board and a motor controlled by the control circuit board are arranged on the driving mechanism, and a contact which is used in combination with the on-off interface for use is mounted at one end of the driving mechanism. The on-off interface is connected onto a high-frequency head on the satellite receiving antenna from the external terminal through the cable, and the contact is connected to the satellite television receiver through the cable. The parts outside the housing of the external terminals are spiral, the other ends of the external cables and the external terminals positioned in the housing are respectively connected with different members, the on-off interface is connected in the external terminal on the left side, the internal cable is connected in the external terminal on the right side, the on-off interface is an improved unthreaded direct insertion F type radio frequency connector female head which comprising a core needle conductor and an external shielding layer conductor, the contact is a straight insertion F type radio frequency connector male head, and, the two are just in adaption. When in use, the external terminal on the two sides can be connected with the cables through the F type radio frequency connector male head and further connected onto the high-frequency head on the satellite receiving antenna and the receiver. The contact is fixed on the driving mechanism, and the driving mechanism drives the contact for realizing the on-off control between the contact and the on-off interface. A control circuit is used for detecting whether the receiver is in the power-on state or the power-off state or the standby state, further controlling the driving mechanism and realizing the on-off control between the on-off interface and the contact. A power supply is used for power supply for the control circuit and the driving mechanism. The housing is used for mounting the on-off interface, the contact, the driving mechanism, the control circuit and the power supply. The on-off control of the driving mechanism is controlled through the circuit board, thereby having no need of manual intervention and being capable of realizing automatic disconnection and connection between the outdoor satellite receiving antenna and the indoor satellite receiver. If lightning predictive signs emerge when a user is watching satellite television, a remote controller can be used for placing the receiver in the standby state, thereby turning off the automatic switch, preventing the invasion of lightning overvoltage and lightning current when the antenna is struck by lightning, not only protecting the receiver and the devices connected therewith, but also further preventing fire and personal injury accidents.

Preferentially, the maximum distance of relative motion between the on-off interface and the contact matched therewith is 1 cm-100 cm, that is, the maximum distance between the on-off interface and the contact during the disconnection of the two is 1 cm-100 cm. It is better to ensure that the maximum distance is 5 cm-100 cm, the distance of the ordinary electrical switch after breaking shall ensure that the power supply can still be cut off after considering the overvoltage and a safety factor under the working voltage level, so that the break distance between the contacts of the switch working at low voltage is very short, only several millimeters, which cannot be used for the anti-lightning purpose. Although the break distance of a high-voltage switch is long, the high-voltage switch is only applicable to a high-voltage power grid due to expensive price and bulky volume. An isolating switch or an isolation knife switch which is commonly used in the field of power systems aims at ensuring personal and equipment safety after disconnection, so that the isolating switch or the isolation knife switch must have obvious disconnection points with sufficient distance after disconnection; although the break distance of the isolating switch or the isolation knife switch is very long after the disconnection, the manual operation type of such isolating switches has the disadvantages of non-automatic working and great energy consumption during actions while having the advantages of simple structure and low cost, and the electric operation type has the disadvantages of high cost, large volume and heavy weight. The above switches are used for switching on or switching off the low-frequency or the direct current power supply, only work in direct current to low frequency range and cannot be used for radio frequency signals. In short, there is no switch which is applicable to anti-lightning isolation of the satellite television receiver, and can keep the sufficient insulation distance between the two disconnection points after the disconnection, and protect the receiver and the devices connected therewith from being damaged, by the lightning strike overvoltage and the lightning current when the satellite antenna is struck by lightning in the existing switches.

Preferentially, housing is constituted by connecting a front side cover with a rear side cover, the guide rail unit includes two guide rail sets which are parallel to each other and positioned on the same plane, one guide rail set is arranged on the inner wall of the front side cover, and the other guide rail set is arranged on the inner wall of the rear side cover. The guide rail is positioned on two sides of the driving mechanism, the guide effect is better, and the guide rail and the side covers are integrally formed.

Preferentially, the guide rail comprises a guide slot and a rack positioned below the guide slot, the driving mechanism is provided with a bulge which is matched with the guide slot on the side surface which is opposite to the guide rail, a gear matched with the rack is arranged below the bulge, and the gear is connected on the motor in the driving mechanism through a gearbox. The motor drives the gear to rotate, due to the matching between the gear and the rack, the driving mechanism can move front and back on the rack, thereby inserting the contact into the on-off interface or leading the contact to be separated and far away from the on-off interface. The bulge on the side surface of the driving mechanism moves in the guide slot for playing the guiding role.

Preferentially, the driving mechanism comprises a support surface, four bulges which are respectively matched with the guide rail unit are respectively arranged at four corners of the support surface, the contact is mounted above the support surface, two supercapacitors are respectively arranged on two sides of the contact, switches are respectively arranged on two sides of the capacitors, the switches are fixed on the circuit board above the contact, and trigger bulges for triggering the switches are respectively arranged at two ends of the housing; and the motor is fixedly arranged below the support surface, and an output shaft of the motor is connected with the gear matched with the guide rail unit through the gearbox. The setting of the supercapacitors aims at supplying power when the receiver does not supply the power any longer after entering into the power-off state or the standby state, no power supply exists in the cable, and the control circuit and the driving mechanism still need the power supply for a period of time to complete the task of leading the contact to be separated and far away from the on-off interface. The trigger bulges are arranged at two ends of the housing, when the driving mechanism moves to the set position in the housing, the trigger bulge at one end oppresses one switch to trigger a reed, thereby controlling the motor to stop rotating.

Preferentially, one end of the contact is connected with the internal cable, a core needle and an external shield positioned outside the core needle are arranged at the other end of the contact, a pin is connected out of the middle part of the core needle, and the pin is connected with the circuit board; and a core needle conductor and an external shielding layer conductor are arranged in the on-off interface. The design of the contact and the on-off interface shall realize that when the plug is inserted each time, the plug is firstly in contact with the external shielding conductor and then in communication with the core needle, when the plug is pulled out each time, the plug is firstly separated from the core needle and then separated from the external shielding conductor. Therefore, the ground potential on two sides of the switch can be consistent when being in contact with or separated from the core needle, thereby preventing the potential difference or static electricity on the core needle from damaging the high-frequency head or the receiver.

Preferentially, the control circuit comprises a power supply soft-start unit of a device connected downstream of the anti-lightning automatic switch, a brake circuit unit capable of preventing the motor from carrying out continued inertial rotation after power outage and a motor running unit, wherein the motor running unit comprises a monitoring module, and the monitoring module is connected with a motor driving module. The contact is connected with the internal cable through a semiconductor switch. The engagement between the contact and the on-off interface is completed by the actions of a mechanical switch, the actions of the mechanical switch are often accompanied by jitter, which can lead the external terminals, the cables connected with the external terminals, the high-frequency head and other follow-up parts to produce a string of pulses on a power cord at the instant of being energized by the contact, be possible to cause oscillation and overvoltage and further possibly causing damages to the high-frequency head, the receiver and other circuits, in order to avoid the problems, the hotplug process of the mechanical switch is changed to the coldplug process, and the semiconductor switch, that is an MOS tube is utilized for connecting with the capacitors, thereby realizing the coldplug of the contact and the power supply soft-start of the parts which are connected downstream of the contact.

Preferentially, a transparent upper cover is arranged above the housing including the front side cover and the rear side cover, and the front side cover, the rear side cover and the upper cover are produced by adopting insulating plastic material. The front side cover and the rear side cover are connected through a bolt, then the upper cover is buckled at the junction of the two, the adoption of the insulating plastic material can realize good insulation effect and ensure the anti-lightning effectiveness, and the upper cover is simultaneously made into the transparent type for leading the user to intuitively see whether the on-off interface is separated from the contact and keeps the sufficient interval with the contact or not after the satellite television receiver enters into the power-off state or the standby state.

Preferentially, the internal cable is spiral. The spiral cable can be expanded and contracted freely, thereby leading the driving mechanism to move more freely.

Therefore, the anti-lightning switch for the satellite television receiver has the following advantages: 1) the control circuit is utilized for controlling the driving mechanism to move back and forth on the guide rail unit, thereby completing the connection between the on/off satellite receiving antenna and the satellite television receiver, realizing the automatic control and preventing lightning strikes; 2) the sufficient insulation distance is arranged between the on-off interface and the contact, thereby leading the switch to realize high voltage resistance and preventing the invasion of the lightning overvoltage and the lightning current when the satellite antenna is struck by lightning; 3) the contact is connected with the internal cable by adopting the semiconductor switch, thereby realizing the coldplug of the contact into the on-off interface and the power supply soft-start of the parts connected downstream of the on-off interface when starting up, avoiding the possible damages to the high-frequency head, the receiver and other parts at the energizing instant, and realizing good safety and long service life; 4) the contact is firstly in contact with the external shielding body and then in butt joint with the core need when being plugged in, thereby preventing the potential difference or the static electricity on the core needle from damaging the high-frequency head or the circuit of the receiver; and 5) the upper cover is transparent, thereby facilitating the observation of on-off status in the switch and ensuring the anti-lightning effectiveness of the switch.

The technical scheme realizes the automatic disconnection and the connection between the outdoor satellite receiving antenna and the indoor satellite without the manual intervention. When the receiver is in the power-in state, the automatic switch is automatically connected without affecting the watching of a satellite television program of the user; when the user leads the receiver to enter into the power-off state or the standby state, the switch can be disconnected automatically and keep the sufficient insulation distance between the contact and the on-off interface, which is a dozen to tens of centimeters generally, and the distance can realize high voltage resistance, thereby preventing the invasion of the lightning overvoltage and the lightning current when the satellite antenna is struck by lightning, not only protecting the receiver and the devices connected therewith, but also further preventing fire and personal injury accidents.

Calculated by the situation that the time for watching television is less than 4 hours per day for the ordinary people and the satellite television receiver is in the power-on state for 4 hours per day, then the satellite television receiver is in the power-off state or the standby state for 20 hours per day, that is, the automatic switch is disconnected for 20 hours per day after installing the automatic switch, being equivalent to that the cable plug which is connected with the outdoor antenna on the receiver is pulled out, thereby reducing the probability of striking the receiver and other devices connected therewith by lightning by $(^{20}/_{24})$ 83% compared before installing the automatic switch. As for the 4 hours of power-on time, because the lightning often has the predictive signs, if the lightning predictive signs emerge in the vicinity when the user is watching the satellite television, the remote controller can be used for placing the receiver in the standby state, thereby turning off the automatic switch, playing the anti-lightning role and having no need of manually pulling out the plug in danger. Therefore, the risk of striking the receiver and other devices connected therewith by lightning via the satellite television receiving antenna and the cable thereon can be basically eliminated after having the automatic switch. If the switch is mounted before the cable enters into the indoor space, the switch can prevent leading the lightning risk into the indoor space via the outdoor satellite receiving antenna and the cable.

DETAILED DESCRIPTION

In combination of the figures, the present technical scheme is further specifically described through the following embodiments.

Embodiment 1

Figure 1:
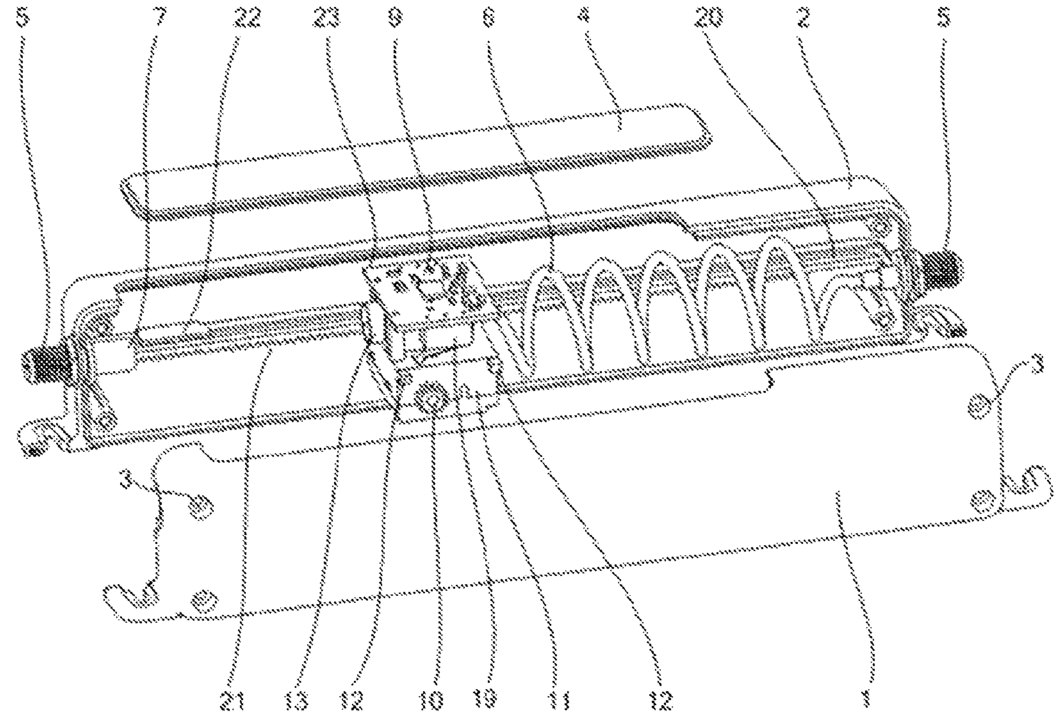
FIG. 1 is an exploded view of anti-lightning automatic switch for satellite television receiver.
Figure 3:
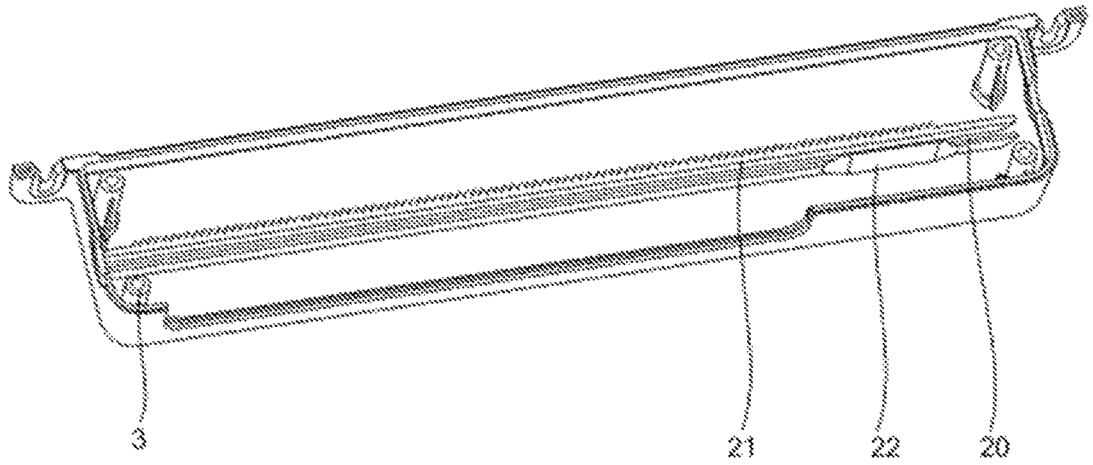
FIG. 3 is an internal schematic diagram of front side cover in FIG. 1.

As shown in FIGS. 1 and 3, an anti-lightning automatic switch for a satellite television receiver comprises a housing, the housing comprises a front side cover 1 and a rear side cover 2, four bolt holes 3 are respectively arranged on the end surface of each one of the front side cover 1 and the rear side cover 2, the bolt holes 3 are positioned at four corners on each end surface, the front side cover 1 and the rear side cover 2 are connected through a bolt, a rectangular through hole is formed at the upper end, a transparent upper cover 4 is buckled in the through hole, and the upper cover 4, the front side cover 1 and the rear side cover 2 are produced by adopting plastic material with good insulativity. Two external terminals 5 are respectively mounted at two ends of the housing, each external terminal 5 is an F type radio frequency connector female head, the external terminals 5 are mounted at the junction of the front side cover 1 and the rear side cover 2, the parts exposed outside the housing of the two external terminals 5 are spiral and connected with external cables through F type radio frequency connector male heads, the external terminal 5 on the left side is connected to a high-frequency head on a satellite receiving antenna, and the external terminal 5 on the right side is connected to the satellite television receiver. One end positioned in the housing of the external terminal on the right side is connected with a spiral internal cable 6, a driving mechanism is connected on the internal cable 6, a straight insertion on-off interface 7 is arranged at one end positioned in the housing of the external terminal on the left side, and the on-off interface 7 comprises a core needle conductor positioned in the interior and an external shielding layer conductor positioned outside the core needle conductor.

Figure 2:
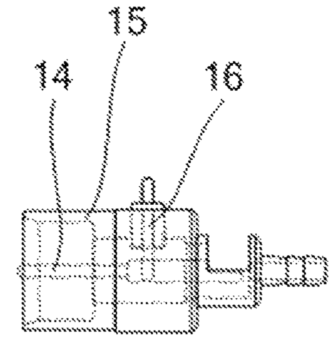
FIG. 2 is a side view of the contact in FIG. 1.
Figure 4:
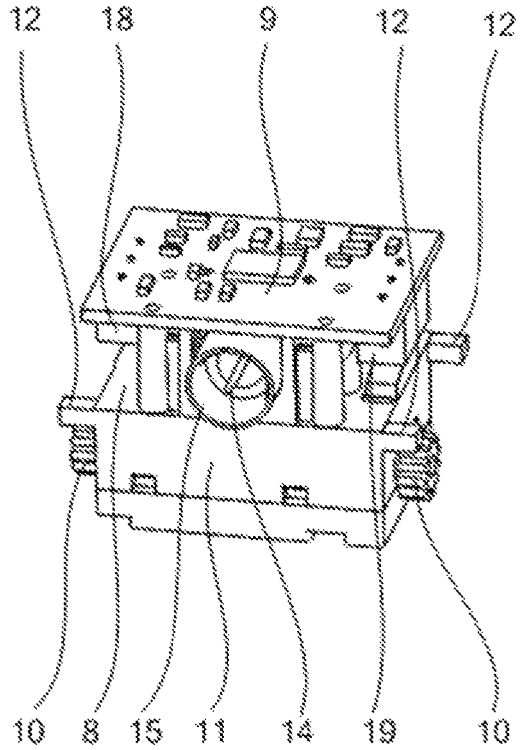
FIG. 4 is a perspective front view of driving mechanism in FIG. 1.
Figure 5:
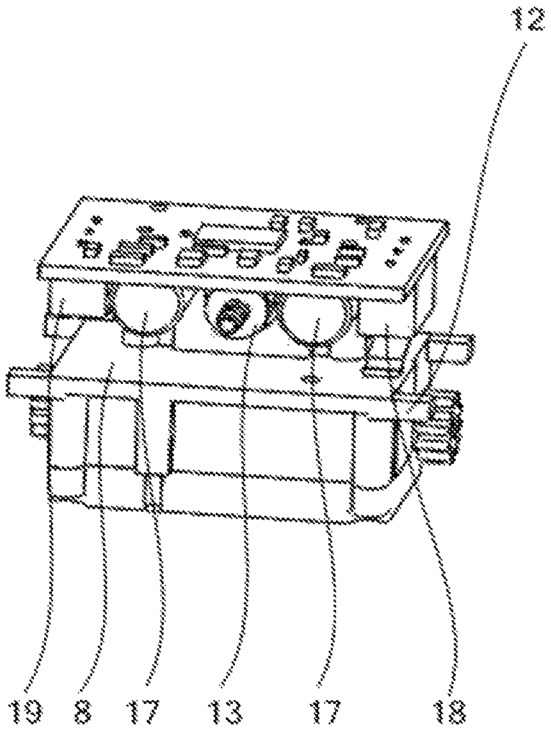
FIG. 5 is a perspective rear view of driving mechanism in FIG. 1.

As shown in FIGS. 4 and 5, the driving mechanism 23 comprises a support surface 8, a control circuit board 9 is arranged above the support surface 8, a control circuit comprises a power supply soft-start unit and a motor running unit, the motor running unit comprises a monitoring module, and the monitoring module is connected with a motor driving module. A driving motor is arranged below the support surface 8, the motor is connected with a gear 10 through a gearbox, and the gear 10 is positioned on the outer side of a reduction box 11. Four bulges 12 are respectively arranged at four corners of the support surface 8, the four bulges 12 are positioned on the same horizontal plane and in the same size and shape, and the gear 10 is positioned below the bulges 12. A contact 13 is fixedly arranged above the support surface 8, the contact 13 can realize connection or disconnection with the on-off interface 7, the contact 13 is designed to be a straight insertion F type radio frequency connector male head which comprises a core needle 14 and an external shielding conductor 15, and a pin 16 for connecting with the control circuit is connected out of the core needle 14 (as shown in FIG. 2). The design of the contact 13 and the on-off interface 7 shall realize that when the plug is inserted each time, the plug is firstly in contact with the external shielding conductor and then in communication with the core needle, when the plug is pulled out each time, the plug is firstly separated from the core needle and then separated from the external shielding conductor. Therefore, the ground potential on two sides of the switch can be consistent when being in contact with or separated from the core needle, thereby preventing the potential difference or static electricity on the core needle from damaging the high-frequency head or the circuit of the receiver. Capacitors 17 are respectively arranged on two sides of the contact 13, switches are respectively arranged on two sides of the capacitors 17, the facing direction of each trigger reed of the switch 18 on the inner side is reverse to that of the corresponding trigger reed of the switch 19 on the outer side, and both the switches 18 on the inner side and the switches 19 on the outer sides are fixed on the circuit board.

Guide rail sets are arranged on the inner walls of the front side cover 1 and the rear side cover 2, and the two guide rail sets are parallel to each other and position on the same plane. A guide rail set comprises a guide slot 20 and a rack 21 which is positioned below the guide slot 20 and parallel to the guide slot 20, a trigger bulge 22 is arranged above the guide slot 20 on the left end part of the rear side cover 2, and the trigger bulge 22 is also arranged above the guide slot 20 at the right end part of the front side cover 1. The bulges 12 at four corners on the support surface of the driving mechanism are guided into the guide slot 20, the driving motor drives the gear 10 to rotate, and the gear 10 is meshed with the rack 21, thereby driving the driving mechanism 23 to move on the guide rail unit. The motor stops rotating after the trigger reed of the switch 18 on the inner side of the driving mechanism 23 collides with the trigger bulge 22 at the left end of the rear side cover 2, in a similar way, the motor also stops rotating after the trigger reed of the switch 19 on the outer side of the driving mechanism collides with the trigger bulge 22 at the right end of the front side cover 1.

In the actual use, the air gap distance between the contact and the on-off interface 7 during the disconnection can meet the desired requirement on the withstand voltage by selecting the appropriate length of the front side cover 1 and the rear side cover 2, the embodiment adopts 16 cm, that is the maximum distance between the contact and the on-off interface after disconnection is 16 cm. The negative polar lightning pulse below 150 kV can be withstood almost, and then the lightning overvoltage below 150 kV cannot step across the air gap between the on-off interface and the contact under the situation that the automatic switch is disconnected, thereby preventing the devices connected downstream of the contact.

Figure 6:
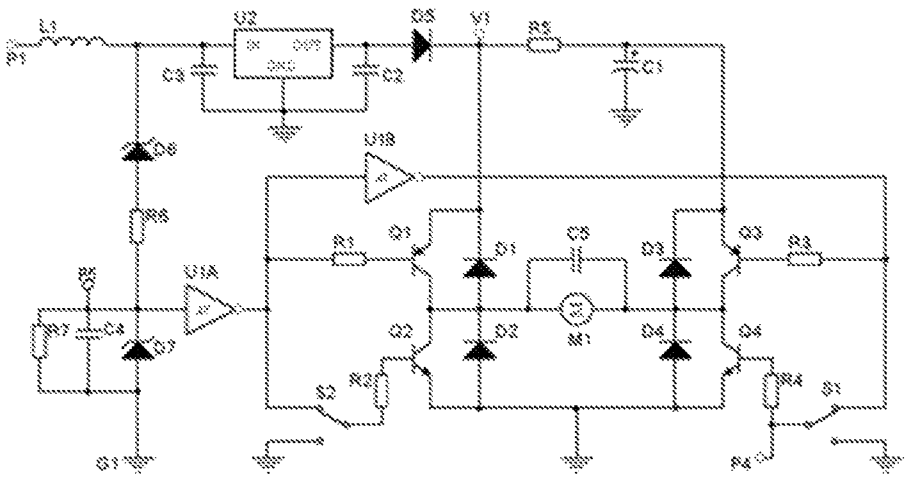
FIG. 6 is a control circuit diagram of anti-lightning automatic switch for satellite television receiver.

The circuit board 9 is mounted on the driving mechanism 23. The control circuit is arranged on the circuit board 9. The principle diagram of the control circuit is as shown in FIG. 6. When in the power-on state, the receiver needs to supply the power to the high-frequency head on the satellite receiving antenna through the cable, and the direct current power supply from 11.5V to 21V exists between the core of the internal cable 6 and the shielding conductor outside the cable. The contact 13 is made into the T-shaped three way form, one end of the core needle 14 can be inserted into the on-off interface 7, the other end is connected with the core of the internal cable 6, the pin 16 is further connected out of the middle of the core needle 14, a node P1 in the control circuit is connected with the pin 16, and the grounding end G1 is connected with the external shielding conductor 15 of the contact 13, thereby leading the control circuit to obtain the power supply. The power supply passes through a choke inductor L1 and a voltage-stabilizing circuit including a voltage-stabilizing integrated circuit U2, a capacitor C2 and a capacitor C3 for reducing the voltage and stabilizing the voltage, and the voltage is 5V in the embodiment. When the receiver is in the power-off state or the standby state, no power supply exists in the cable, and the direct current power supply from 11.5V to 21V only exists in the power-on state. Whether the receiver is in the power-on state or the power-off state (or standby state) can be known by monitoring the voltage on the node P1. Voltage regulator diodes D6 and D7, resistors R6 and R7, a capacitor C4 and an inverter U1A with a Schmitt trigger constitute the monitoring circuit. When the voltage on the node P1 is higher than about 8V after powering up the receiver, the input end of the inverter U1A is high level, and the output is low level for conducting a triode Q1 and cutting off the triode Q2; simultaneously, the input of the inverter U1B with the Schmitt trigger is low level, and the output is high level for cutting off the triode Q3 and conducting the triode Q4, thereby leading the motor M1 to carry out clockwise rotation, and leading the driving mechanism to drive the contact 13 to move to the on-off interface 7 on the left side and be inserted into the on-off interface 7. When the voltage on the node P1 is lower than about 8V after the receiver is in power-off state or the standby state, the input end of the inverter U1A is low level, and the output is high level for conducting the triode Q1 and cutting off the triode Q2; simultaneously, the input of the inverter U1B is high level, and the output is low level for cutting off the triode Q3 and conducting the triode Q4, thereby leading the motor M1 to carry out counterclockwise rotation, and leading the driving mechanism 23 to drive the contact 13 to be separated from the on-off interface and far away from the on-off interface 7.

When in power-on state, the receiver supplies the power to the high-frequency head and can also supply the power to the control circuit, thereby leading the control circuit and the driving mechanism to complete the task of inserting the contact 13 into the on-off interface 7. When in power-off state or standby state, the receiver does not supply the power any longer, no power supply exists in the cable, while the control circuit and the driving mechanism still need the power supply for a period of time to complete the task of leading the contact 13 to be separated from the on-off interface 7 and far away from the on-off interface 7, the power supply at this time is provided by the supercapacitor C1. In the embodiment, the supercapacitor C1 is formed by connecting two 2.7V/1F supercapacitors 17. When the receiver is in the power-on state, the output end of the voltage-stabilizing integrated circuit U2 charges the supercapacitor C1 via the diode D5 and the resistor R5. In general, the sufficient electrical quantity can be filled in the supercapacitor C1 within more than ten seconds after entering into the power-on state. The electrical quantity in the supercapacitor C1 can maintain the control circuit and the motor M1 for working more than ten seconds after entering into the power-off state, thereby being sufficient to lead the control circuit and the driving mechanism to complete the task of leading the contact 13 to be separated from the on-off interface 7 and far away from the on-off interface 7. Therefore, in the embodiment, the power supply includes the power supply in the receiver and the supercapacitor C1.

The power supply of the inverters U1A and U1B is obtained at the node V1.

When the receiver is in the power-on state, the triodes Q1 and Q4 are conducted for leading the motor M1 to carry out the clockwise rotation, when the driving mechanism 23 reaches the position of inserting the contact 13 into the on-off interface 7, the trigger bulge 22 on the rear side cover 2 oppresses the trigger reed on the switch 18 on the inner side (that is the switch S1 in FIG. 6) to lead the switch 18 on the inner side to be grounded, thereby cutting off the triode Q4 and stopping the rotation of the motor M1. When the receiver is in the power-off state, the triodes Q3 and Q2 are conducted for leading the motor M1 to carry out the counterclockwise rotation, when the driving mechanism leads the contact 13 to be separated from the on-off interface 7 and reach the farthest position, the trigger bulge 22 on the front side cover 1 oppresses the trigger reed on the switch 19 on the outer side (that is the switch S2 in FIG. 6) to lead the switch 19 on the outer side to be grounded, thereby cutting off the triode Q2 and stopping the rotation of the motor M1.

When in the power-on state, the working current required for the automatic switch comprises the current of the control circuit, the current of the motor M1 and the current for charging the supercapacitor C1, and the total current is lower than 500 mA. When the contact is in place, the motor M1 stops rotating and the supercapacitor C1 is basically fully charged, the total current consumed by the automatic switch is reduced to about 10 mA.

When the contact 13 moves to the on-off interface 7 and is inserted into the on-off interface 7, the power supply provided by the receiver has existed between the core needle 14 of the contact 13 and the external shielding contactor 15, and the power supply will be suddenly added on the external terminals 5, the cables connected therewith, the high-frequency head and other follow-up parts downstream of the contact 13 is in contact with the on-off interface 7, which is the so-called live hotplug. The plugging-in and pulling-out between the contact 13 and the on-off interface 7 are completed by the actions of a mechanical switch, the actions of the mechanical switch are often accompanied by jitter, which can lead the external terminals 5, the cables connected with the external terminals, the high-frequency head and other follow-up parts to produce a string of pulses on a power cord at the instant of being energized by the contact, be possible to cause oscillation and overvoltage and further possibly causing damages to the high-frequency head, the receiver and other circuits. In order to avoid the problems, the hotplug process of the pure mechanical switch can be changed to the coldplug process, and the semiconductor switch is utilized to realize the power supply soft-start of the external terminals, the cables connected therewith, the high-frequency head and other follow-up parts. The implementation method is as shown in FIG. 7.

Figure 7:
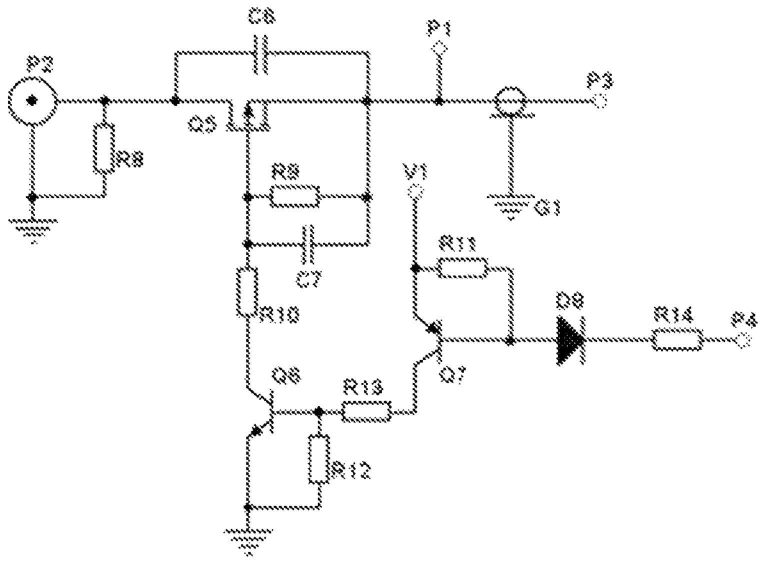
FIG. 7 is a circuit diagram of power supply soft-start unit of anti-lightning automatic switch for satellite television receiver.

In FIG. 7, the node P2 is connected with the core needle 14 of the contact 13, the node P3 is connected with the internal cable 6, and an MOS tube Q5 and the capacitor C6 are connected between the nodes P2 and P3. It can be seen that the internal cable 6 is not in direct connection with the contact 13 any longer, but carries out the connection through the semiconductor switch, that is the MOS tube Q5 and the capacitor C6. The node P1 is connected with the node P1 in FIG. 6 for supplying the power to the control circuit. The node V1 is connected with the node V1 in FIG. 6. The node P4 is connected with the node P4 in FIG. 6. When the contact 13 moves to the on-off interface 7, the node P4 in FIG. 6 is high level, the triodes Q6 and Q7 in FIG. 7 are cut off, the MOS tube Q5 is also cut off, and no voltage exists on the node P2. When the contact is inserted into the on-off interface, the switch S1 in FIG. 6 is grounded for leading the node P4 to become low level, the triodes Q6 and Q7 are conducted, and the power supply on the node P3 charges the capacitor C7 through the resistor R10 and the triode Q6, thereby gradually reducing the voltage of a grid of the MOS tube Q5, further gradually reducing the resistance between a source and a drain of the MOS tube Q5 and realizing the soft-start of the voltage on the node P2. The rise time of the voltage on the node P2 is decided by the resistors R9 and R10 and the capacitor C7. The appropriate resistors R9 and R10 and the capacitor C7 are selected, when the contact is completely inserted into the on-off interface in place, the MOS tube Q5 is then gradually conducted, and the MOS tube Q5 is not conducted during the process of inserting the contact into the on-off interface, thereby being the electrical coldplug process. Therefore, the jitter when being energized caused by the pure mechanical switch can be avoided, the power supply soft-start of the external terminals, the cables connected therewith, the high-frequency head and other follow-up parts can be realized, and the embodiment can become more reliable.

When the receiver is in the power-off state or the standby state, the residual voltage on the node P3 is reduced to below about 8V, and then the control circuit and the driving mechanical can carry out actions for leading the contact to be separated from the on-off interface, which is the coldplug process without considering the jitter problem.

Figure 8:
FIG. 8 is a circuit diagram of brake circuit unit of anti-lightning automatic switch for satellite television receiver.

After the contact 13 is inserted into the on-off interface 7 in place, the motor M1 is de-energized, a rotor thereof can continue the rotation for a while due to inertia, at this time the contact 13 has been inserted into the on-off interface 7, the driving mechanism 23 cannot continue to go forward, the rotation of the rotor of the motor M1 due to inertia may cause the sticking of the driving mechanism 23, and then the driving mechanism 23 cannot retreat, thereby causing a fault. In order to prevent the problems, the capacitor C8 can be connected between the node P4 and the node P5 in the circuit in FIG. 6, as shown in FIG. 8. When the driving mechanism 23 reaches the position of inserting the contact 13 into the on-off interface 7, the switch 18 on the inner side is grounded, that is the node P4 is grounded, and the capacitor C8 can temporarily pull down the potential of the node P5 to the ground potential and then gradually re-raise the potential, thereby leading the U1A to output a high level pulse, leading the U1B to simultaneously output a low level pulse, conducting the triodes Q2 and Q3 for a short period of time, leading the motor M1 to obtain a counterclockwise rotation voltage pulse, preventing the forward rotation of the rotor of the motor M1 due to inertia, realizing the brake and avoiding sticking the driving mechanism 23. The capacitor C8 and the switch 18 on the inner side (that is the S1) constitute a brake circuit unit.

Embodiment 2

The difference between the embodiment 2 and the embodiment 1 is that the maximum distance between the contact and the on-off interface after disconnection is 5 cm. The rest is the same with the embodiment 1.

Embodiment 3

The difference between the embodiment 3 and the embodiment 1 is that the maximum distance between the contact and the on-off interface after disconnection is 100 cm. The rest is the same with the embodiment 1.

What is claimed is:

1. An anti-lightning automatic switch for a satellite television receiver, comprising:
- a housing having an outer surface;
- first and second external terminals connected with external cables respectively, the first and second external terminals being located on the outer surface of the housing;
- an on-off interface disposed in the housing, the on-off interface being connected to the first external terminal;
- an internal cable disposed in the housing, the internal cable being connected to the second external terminal;
- a guide rail unit disposed in the housing;
- a driving mechanism mounted on the guide rail unit, the driving mechanism including a control circuit board and a motor controlled by the control circuit board, the driving mechanism being connected with the internal cable; and
- a contact mounted at an end of the driving mechanism, the contact being connectable to and detachable from the on-off interface.

2. The anti-lightning automatic switch for the satellite television receiver according to claim 1, wherein a maximum distance between the on-off interface and the contact of the driving mechanism is in the range of 1 cm to 100 cm.

3. The anti-lightning automatic switch for the satellite television receiver according to claim 1, wherein the housing further includes a front side cover and a rear side cover; the guide rail unit including a pair of guide racks positioned in a same plane and parallel to each other, one of the guide racks being mounted on an inner wall of the rear side cover.

4. The anti-lightning automatic switch for the satellite television receiver according to claim 3, wherein the guide rail unit further includes a pair of guide slots positioned in a same plane and parallel to each other, and
- wherein the driving mechanism further includes at least a bulge engageable with one of the guide slots, and a gear positioned below the bulge and engageable with one of the guide racks, the gear being connected to the motor.

5. The anti-lightning automatic switch for the satellite television receiver according claim 1, wherein the driving mechanism further includes a support to surface, four bulges arranged at four corners of the support surface, respectively, and engageable with the guide rail unit,
- wherein the contact is mounted above the support surface, the contact including two supercapacitors disposed on two sides of the contact, respectively, switches being respectively disposed on two sides of the supercapacitors, the switches being fixed on the circuit board above the contact, trigger bulges for triggering the switches being respectively disposed at two ends of the housing; the motor being fixedly disposed below the support surface, an output shaft of the motor being connected with a gear engageable with the guide rail unit through a gearbox.

6. The anti-lightning automatic switch for the satellite television receiver according to claim 5, wherein one end of the contact is connected with the internal cable, the contact including a core needle disposed at another end of the contact and an external shield positioned around the core needle, a pin connected with the circuit board being connected to the core needle at a middle part of the needle; the on-off interface including a core needle conductor and an external shielding layer conductor,
- when the contact is being connected with the on-off interface, the external shield of the contact is in contact with the external shielding layer conductor of the on-off interface at first and then the core needle of the contact is in contact with the core needle conductor of the on-off interface; and
- when the contact is being disconnected with the on-off interface, the core needle of the contact is disconnected from the core needle conductor of the on-off interface first and then the external shield of the contact is disconnected from the external shielding layer conductor of the on-off interface.

7. The anti-lightning automatic switch for the satellite television receiver according to claim 1, wherein the control circuit includes a power supply soft-start unit of a device connected downstream of the anti-lightning automatic switch, a brake circuit unit for preventing the motor from carrying out continued inertial rotation after power outage and a motor running unit, wherein the motor running unit includes a monitoring module connected with a motor driving module.

8. The anti-lightning automatic switch for the satellite television receiver according to claim 3, wherein the housing further includes a transparent upper cover disposed on top of the housing, the front side cover, the rear side cover and the upper cover including insulating plastic material.

9. The anti-lightning automatic switch for the satellite television receiver according to claim 1, wherein the internal cable is in a spiral shape.

10. The anti-lightning automatic switch for the satellite television receiver according to claim 1, wherein the internal cable is connected with the contact through a semiconductor switch.

11. A method for making an anti-lightning automatic switch for a satellite television receiver, comprising:

disposing first and second external terminals on an outer surface of a housing;

disposing an on-off interface in the housing, the on-off interface being connected to the first external terminal;

disposing an internal cable in the housing, the internal cable being connected to the second external terminal;

disposing a guide rail unit in the housing;

mounting a driving mechanism on the guide rail unit, the driving mechanism including a control circuit board and a motor controlled by the control circuit board;

connecting the driving mechanism with the internal cable; and mounting a contact at an end of the driving mechanism, the contact being connectable to and detachable from the on-off interface.

12. The method for making the anti-lightning automatic switch for the satellite television receiver of claim 11, wherein the housing is sized to allow a maximum distance between the on-off interface and the contact of the driving mechanism to be in the range of 1 cm to 100 cm.

* * * * *